United States Patent [19]
Wilson

[11] 3,863,991
[45] Feb. 4, 1975

[54] VEHICLE BRAKE SYSTEM
[75] Inventor: John F. Wilson, Racine, Wis.
[73] Assignee: J. I. Case Company, Racine, Wis.
[22] Filed: Sept. 17, 1973
[21] Appl. No.: 398,202

[52] U.S. Cl. .................... 303/6 A, 60/581, 180/6.2
[51] Int. Cl. ............................................. B60t 11/18
[58] Field of Search .............. 60/567, 581; 180/6.2; 188/16, 106 P, 345; 303/2, 6 A, 6 R

[56] References Cited
UNITED STATES PATENTS
| | | | |
|---|---|---|---|
| 2,616,658 | 11/1952 | Dombeck | 180/6.2 X |
| 3,339,986 | 9/1967 | Lowin et al. | 303/6 R |
| 3,466,096 | 9/1969 | Cunningham | 180/6.2 X |

Primary Examiner—Duane A. Reger
Attorney, Agent, or Firm—Dressler, Goldsmith, Clement & Gordon, Ltd.

[57] ABSTRACT

The invention disclosed herein relates to a braking system for a vehicle that has four wheel brakes. The braking system is a hydraulic system that includes individual actuating means for the respective rear brakes that may be separately actuated for independent rear wheel braking to assist in turning of the vehicle. The individual actuating means are also interconnected with the front wheels to produce automatic four wheel braking when both rear wheel brakes are operated simultaneously and prevent actuation of either front brakes when only one rear brake is operated.

6 Claims, 2 Drawing Figures

VEHICLE BRAKE SYSTEM

BACKGROUND OF THE INVENTION

On most heavy duty vehicles, such as tractors, the traditional braking system consists of separate and independent brakes for each rear wheel. The independent brakes for each rear wheel allow the operator to utilize the brakes to assist in turning of the vehicle under adverse conditions of draft or soil that tend to make normal steering difficult.

In vehicles of this type, it is customary to locate the two brake pedals that operate the respective brakes on the rear wheels adjacent each other so that the brakes may be latched together by a mechanical device and both brakes may be operated simultaneously when the vehicle is operating at higher speeds, such as on roadways.

One problem with such a braking system is that the two braking units may be unequally actuated since the units may have substantially different running clearances or be worn materially different amounts. As a result, one of the brake units may be excessively energized while another brake unit may be inadequately energized so that the vehicle may be caused to swerve.

Another problem encountered with braking systems in heavy duty vehicles of this type, is that the braking force may not be adequate for the vehicle at high speeds because of the excessive weight of the vehicle. To solve this problem it has been proposed to provide auxiliary braking systems such as the system disclosed in U.S. Pat. No. 3,386,775 issued to E. L. Jones on June 4, 1968. However, such auxiliary braking systems have not solved the problem of unequal braking by the primary system and, as such, have not been accepted on a large scale commercial basis.

SUMMARY OF THE INVENTION

The present invention provides a simple and efficient hydraulic braking system for a heavy duty vehicle, such as a tractor, which has independent brakes for each rear wheel. The braking system is designed so that the two rear wheel brakes can be operated independently and, when simultaneously operated, will automatically result in four wheel braking with the remaining two brakes cooperating with the front wheels of the vehicle. The system is designed to produce an automatic balance in the braking force on opposite sides of the vehicle when four wheel braking is utilized.

The braking system consists of left and right hand rear brakes and left and right hand front brakes with an actuating system for operating the two rear brakes individually and automatically operating all four brakes when both rear brakes are operated. The actuating system consists of a source of fluid connected to left and right individual actuating means and first and second actuators respectively cooperating with the left and right hand actuating means for moving the actuating means between inoperative and operative positions. The left and right hand actuating means, when moved to the operative positions, respectively supply fluid to fluid motors that form part of the left and right rear brakes.

The actuating system also incorporates hydraulic circuits between the left and right actuating means and the front brakes for supplying fluid under pressure to fluid motors forming parts of the front brakes when both actuating means are in the operative position and preventing actuating of the front brakes when either actuating means is in an inoperative position. The hydraulic circuits are arranged so that the fluid under pressure from the left actuating means is supplied to the right front brake and the fluid from the right actuating means is supplied to the left front brake when four wheel braking is needed.

DETAILED DESCRIPTION

Figures 1, 2:
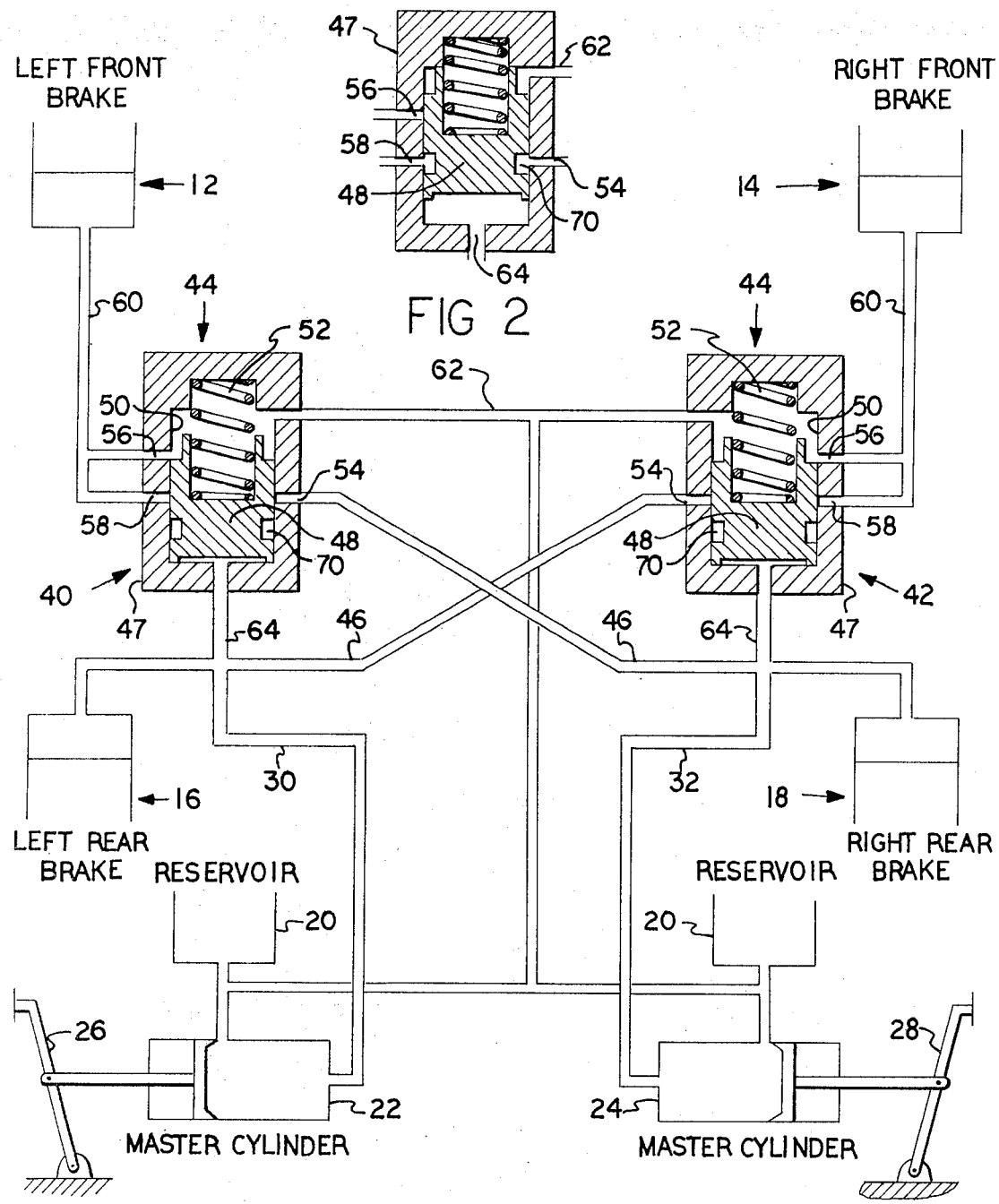
FIG. 1 schematically illustrates the braking system of the present invention.
FIG. 2 is a sectional view of a control valve forming part of the braking system and shown in a second or operative position.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated. The scope of the invention will be pointed out in the appended claims.

FIG. 1 of the drawing generally discloses a braking system 10 for heavy duty vehicles such as large agricultural tractors. Braking system 10 consists of left fron brake 12, right front brake 14, left rear brake 16 and right rear brake 18. Only the fluid motors forming parts of each of the brakes have been shown since the brake itself forms no part of the present invention. Suffice it to say that the actual brakes themselves could be caliper type disc brakes, expanding drum brakes, external band brakes and other types which can be actuated by fluid motors or hydraulic cylinders that are schematically illustrated as the brakes in the drawings.

The actuating system for the four brakes includes a source of fluid contained in a reservoir 20 which is connected to first and second master cylinders or actuating means 22 and 24. The actuating means or master cylinders will be referred to as left actuating means 22 and right actuating means 24 which may be individually actuated by actuators 26 and 28. The output of the left actuating means or master cylinder 22 is supplied to the left rear brake through conduit 30 while the output of the right actuating means or master cylinder 24 is supplied to the right rear brake 18 through conduit 32. Thus, when the left-hand foot pedal or actuator 26 is depressed, the left master cylinder will be moved from an inoperative to an operative position and fluid under pressure will be delivered through conduit 30 to the left rear brake to produce a braking action on the left rear wheel. Likewise, depression of the right-hand foot pedal or actuator 28 will move the right master cylinder 24 from an inoperative to an operative position to supply fluid under pressure through conduit 32 to the right rear brake.

The braking system also incorporates means between the left and right actuating means 22 and 24 and the front brakes 12 and 14 for supplying fluid under pressure to the front brakes when both master cylinders are in an operative position and also prevents actuation of either front brakes when either master cylinder is in an inoperative position. This means consists of first and second hydraulic circuits 40 and 42 with the first hydraulic circuit 40 being between the right actuating means 24 and the left front brake 12 while the second hydraulic circuit 42 is between the left actuating means 22 and the right front brake 14.

The first hydraulic circuit 40 includes a normally closed valve 44 connected to conduit 32 through another conduit 46. Valve 44 is a normally closed valve that has a housing 47 and a piston 48 reciprocated in a bore 50 and biased to a closed position by a spring 52. Bore 50 has a first port 54 to which conduit 46 is connected and second and third ports 56 and 58 located on the opposite side of the bore with port 58 being in circumferential alignment with port 54. Ports 56 and 58 are connected to the fluid motor forming part of the left front brake 12 through a conduit 60. The bore 50 is also in communication with reservoir 20 through a further conduit 62.

The second hydraulic circuit is identical in construction to the first hydraulic circuit so far described. In addition, the second hydraulic circuit 42 has a branch conduit 64 leading from the connection between conduits 30 and 46 to the lower end of the valve bore 50 in the first hydraulic circuit 42. Likewise, the first hydraulic circuit 40 has a branch conduit 64 leading to the lower end of valve bore 50 in the second hydraulic circuit.

The operation of the braking system will now be described. Assuming that both actuators are in the neutral position, both actuating means or master cylinders will be in an inoperative position (biased to this position by springs, not shown) so that no fluid under pressure will be available for actuating any of the brakes. In this condition, both valves 44 in the respective hydraulic circuits 40 and 42 will be in the normally closed position or biased to a position shown in FIG. 1 wherein communication between ports 54 and 58 is blocked while port 56 is in communication with conduit 62 so that any fluid in the left and right front fluid motors 12 and 14 will return to the reservoir. If the left hand pedal or actuator 26 is depressed, fluid under pressure will be delivered from reservoir 20 through conduit 30 to the left rear brake to actuate the brake. At the same time, this pressurized fluid will be received into valve bore 50 through branch conduit 64 and overcome the bias of spring 52 to move the valve spool 48 in the first hydraulic circuit 40 to the second position shown in FIG. 2. In this position, port 56 will be blocked while port 58 will be in communication with port 54 through annular groove 70 in valve spool 48. This will mean that the left front brake will be in direct communication with the right hand actuating means or master cylinder 24. However, at this time the right hand actuating means is in an inoperative position so that no fluid under pressure is available for actuating the left front brake.

The same condition will occur with the right hand foot pedal or actuator 28 being depressed while the left hand foot pedal or actuator and associated master cylinder are in inoperative position.

When both foot pedals or actuators 26 and 28 are depressed both the left and right rear brakes will be actuated by fluid under pressure being delivered from the actuating means or master cylinders 22 and 24 through the respective conduits 30, 32 to the respective left and right rear brakes. At this same time, both valves 44 will have their valve spools 48 in the position illustrated in FIG. 2, referred to as the open position, so that hydraulic fluid under pressure from the second actuating means or master cylinder 24 will be delivered through conduit 32 and 46 to conduit 60 to actuate the left fron brake 12 while the fluid under pressure from conduit 30 will be delivered through conduit 46 and right hand valve 44 to the right front brake 14. This means that all four brakes will be in the actuated position and maximum braking force will be applied to the vehicle.

If at any time either the left rear or the right rear brake pedal is released, the illustrated piston forming part of the master cylinder is automatically moved to the inoperative position (through springs not shown) which means that there is no fluid under pressure available to either conduit 46 or 64. This will mean that one valve 44 will automatically move to its normally closed position and no fluid under pressure is available to the other valve for actuating the associated brake.

The advantages of the cross connection between the left rear actuator and the right front brake have been described but will be briefly summarized. The arrangement is such that the fluid for actuating the left rear and right front brakes will be at the same pressure and therefore essentially the same braking force will be applied to the left rear wheel and the right front wheel. The same will be true with respect to the right rear wheel and the left front wheel so that the forces available for application of braking forces to the opposite sides of the vehicle will at all times be substantially equal.

Summarizing, the braking system described above allows the operator to automatically (1) apply only the left rear brake by only depressing the left brake pedal, (2) apply only the right rear brake by depressing only the right brake pedal, (3) applying all four brakes by depressing both brake pedals either simultaneously or in sequence, (4) releasing both front brakes and the right rear brake by releasing the right brake pedal while retaining the left brake pedal in the depressed condition, and (5) releasing both front brakes and the left rear brake by releasing the left brake pedal while retaining the right brake pedal in the depressed position.

As can be seen from the above description, the present invention provides a simple and inexpensive expedient for incorporating a four wheel brake system into any vehicle while utilizing a minimum number of inexpensive parts. For example, the two valves 44 could readily be pressure responsive check valves that are in the normally closed condition and the actuating means 22 and 24 can be in the form of conventional master cylinders that are commercially available and already form part of a heavy duty vehicle.

What is claimed is:

1. In a braking system for a vehicle having left and right front brakes and left and right rear brakes, an actuating system for said brakes including a source of fluid, left and right individual actuating means cooperating with said source for respectively supplying fluid under pressure to said left and right rear brakes, first and second actuators respectively cooperating with left and right actuating means for moving said actuating means between inoperative and operative positions, and means between said left and right actuating means and said front brakes, said last means including valve means between said left and right actuating means and said left and right front brakes for (1) supplying fluid under pressure to said front brakes from said actuating means when both actuating means are in operative positions and (2) preventing actuation of said front brakes when either actuated means is in an inoperative position.

2. A braking system as defined in claim 1, in which said means between said left and right actuating means and said front brakes, includes first means for directing the fluid under pressure from said right actuating means to said left front brake and second means for directing fluid under pressure from said left actuating means to said right front brake when both actuating means are in operative positions.

3. In a braking system for a vehicle having left and right front brakes and left and right rear brakes, an actuating system for said brakes including a source of fluid, left and right individual actuating means cooperating with said source for respectively supplying fluid under pressure to said left and right rear brakes, first and second actuators respectively cooperating with left and right actuating means for moving said actuating means between inoperative and operative positions, and means between said left and right actuating means and said front brakes for (1) supplying fluid under pressure to said front brakes when both actuating means are in operative positions and (2) preventing actuation of said front brakes when either actuated means is in an inoperative position, said means between said left and right actuating means and said front brakes including normally closed valve means between said actuating means and said left and righr front brakes.

4. A braking system as defined in claim 3, in which said normally closed valve means includes first and second valves respectively cooperating with said left and right front brakes, and in which said means cooperating with said actuating means includes a first conduit connecting said left actuating means to said first valve and a second conduit connecting said right actuating means to said second valve for opening said valves when the associated actuating means is in an operative position.

5. A braking system as defined in claim 4, in which said means cooperating with said actuating means includes a conduit connecting said left actuating means to said second valve for supplying fluid under pressure to said right front brake when said second valve is open and a further conduit connecting said right actuating means to said first valve for supplying fluid to said left front brake when said first valve is open.

6. In a braking system for a vehicle having left and right front brakes and left and right rear brakes, an actuating system for said brakes including a source of fluid, left and right individual actuating means cooperating with said source for respectively supplying fluid under pressure to said left and right rear brakes, first and second actuators respectively cooperating with left and right actuating means for moving said actuating means between inoperative and operative positions, and means between said left and right actuating means and said front brakes for (1) supplying fluid under pressure to said front brakes when both actuating means are in operative positions and (2) preventing actuation of said front brakes when either actuated means is in an inoperative position, said means between said left and right actuating means and said front brakes including a first hydraulic circuit between said right actuating means and said left front brake and a second hydraulic circuit between said left actuating means and said right front brake, each hydraulic circuit including a normally closed valve, said first hydraulic circuit having a branch conduit connected to the valve in said second hydraulic circuit for opening the valve where the first hydraulic circuit had fluid under pressure, said second hydraulic circuit having a branch conduit connected to the valve in the first hydraulic circuit for opening the valve when the second hydraulic circuit has fluid under pressure.

* * * * *

UNITED STATES PATENT OFFICE
CERTIFICATE OF CORRECTION

Patent No. 3,863,991          Dated February 4, 1975

Inventor(s) John F. Wilson

It is certified that error appears in the above-identified patent and that said Letters Patent are hereby corrected as shown below:

Column 2, line 29, "fron" should be --front--.

Column 3, line 58, insert --an-- after "in".

Column 4, line 2, "fron" should be --front--.

Column 5, line 28, "righr" should be --right--.

Column 6, line 32, "where" should be --when--.

Column 6, line 33, "had" should be --has--.

Signed and Sealed this twenty-ninth Day of July 1975

[SEAL]

Attest:

RUTH C. MASON
Attesting Officer

C. MARSHALL DANN
Commissioner of Patents and Trademarks